United States Patent
Achterberg et al.

(10) Patent No.: US 10,223,173 B2
(45) Date of Patent: Mar. 5, 2019

(54) DETERMINISTIC PARALLELIZATION THROUGH ATOMIC TASK COMPUTATION

(71) Applicant: International Business Machines Corporation, Armonk, NY (US)

(72) Inventors: Tobias Achterberg, Berlin (DE); Daniel Junglas, Mainz (DE); Roland Wunderling, Graz (AT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/056,942

(22) Filed: Oct. 18, 2013

(65) Prior Publication Data

US 2014/0047455 A1    Feb. 13, 2014

Related U.S. Application Data

(63) Continuation of application No. 13/149,226, filed on May 31, 2011, now Pat. No. 8,601,486.

(51) Int. Cl.
*G06F 9/52* (2006.01)

(52) U.S. Cl.
CPC .............. *G06F 9/52* (2013.01); *G06F 9/526* (2013.01)

(58) Field of Classification Search
CPC ............. G06F 9/526; G06F 9/52; G06F 9/524
See application file for complete search history.

(56) References Cited

U.S. PATENT DOCUMENTS

2001/0014905 A1* 8/2001 Onodera ................ 709/102
2008/0034371 A1* 2/2008 Gustafson et al. ........ 718/106
2008/0134193 A1* 6/2008 Corley et al. ............. 718/104
2012/0023505 A1* 1/2012 Shin et al. ............... 718/108

FOREIGN PATENT DOCUMENTS

JP       2008-228286      *  9/2018

OTHER PUBLICATIONS

Borchers et al. (An improved brand and bound algorithm for mixed integer nonlinear programs; Sep. 17, 1991).*
Tawarmalani et al. (A polyhedral branch-and-cut approach to global optimization; published online: May 3, 2005).*
AAPA (applicant's admitted prior art).*

* cited by examiner

*Primary Examiner* — Sisley N Kim
(74) *Attorney, Agent, or Firm* — Steven M. Greenberg, Esq.; Shutts & Bowen LLP

(57) ABSTRACT

A method for deterministic locking in a parallel computing environment is provided. The method includes creating a data structure in memory of a computer for a shared resource. The data structure encapsulates a reference to an owner of a lock for the shared resource and a queue of threads able to seek exclusive access to the shared resource. The queue in turn includes different entries, each entry including an identifier for a corresponding one of the threads and a deterministic time computed for the corresponding one of the threads from a count of memory accesses occurring in the corresponding one of the threads. Consequently, a thread can be selected from the queue to receive ownership of the lock and exclusive access to the shared resource based upon a deterministic time for the selected thread as compared to other deterministic times for others of the threads in the queue, for example, a lowest deterministic time.

6 Claims, 4 Drawing Sheets

DETERMINISTIC PARALLELIZATION THROUGH ATOMIC TASK COMPUTATION

CROSS-REFERENCE TO RELATED APPLICATIONS

This application is a Continuation of U.S. application Ser. No. 13/149,226, filed May 31, 2011, currently pending, the entirety of which is incorporated herein by reference.

BACKGROUND OF THE INVENTION

Field of the Invention

The present invention relates to parallel computing and more particularly to deterministic parallelization.

Description of the Related Art

Parallel computing is a form of computation in which many calculations are carried out simultaneously, operating on the principle that large problems can often be divided into smaller ones, which are then solved concurrently. There are several different forms of parallel computing, for example bit-level, instruction level, data, and task parallelism. Parallelism has been employed for many years, mainly in high-performance computing. More recently, parallel computing has become the dominant paradigm in computer architecture, mainly in the form of multicore processors.

Parallel computers can be classified according to the level at which the computing hardware platform supports parallelism—with multi-core and multi-processor computers having multiple processing elements within a single machine, while clusters and grids using multiple computers to work on the same task. Specialized parallel computer architectures are sometimes used alongside traditional processors, for accelerating specific tasks. The advent of multi-threaded operating environments specifically supports parallelism by executing different threads in different processor or processor cores and assigning different tasks of a computer program to different threads.

Thus, managing the assignment and execution of different processing tasks to different threads of execution can in of itself require sophisticated programmatic logic. Hence, parallel computer programs are more difficult to write than sequentially executing computer programs. Of note, parallel computer programs require constant consideration of programmatic and execution flaws resulting from the inherent concurrency of parallel computing and the shared access to common resources in a parallel computing environment. In this regard, concurrency introduces several new classes of potential software flaws, of which race conditions are the most common.

Race conditions in which different processes attempt to access the same, shared resource, generally can be managed through the intelligent use of locks. Locking mechanisms manage access to a shared resource by maintaining a queue of processes, for example different threads of execution, seeking access to the shared resource and an indication of a current thread accorded exclusive access to the shared resource. The current thread accorded exclusive access can release the lock when the current thread no longer requires access to the shared resource. Thereafter, a different thread in the queue can be granted exclusive access to the shared resource. Of note, a scheduler can manage the granting of access to the shared resource by selecting a thread from the queue and granting exclusive access to the shared resource to the selected thread.

The selection of a thread in the queue by the scheduler can be characterized as "opportunistic". In this regard, the scheduler is not bound to any particular algorithm for selecting a thread in the queue of a shared resource to exclusively access the shared resource. To wit, given the same entrants in the queue of a shared resource through multiple different executions of a computer program, a different thread can be selected under the same conditions in each instance. While the opportunistic behavior of the scheduler can appear random, the opportunistic behavior of the scheduler provides a degree of simplicity in implementing. The simplicity of implementation, though, comes at a cost—debugging the performance of an application can be challenging due to the difficulty in repeating the same state of an application.

Deterministic management of the locking of a shared resource, unlike opportunistic locking, provides for a predictable way in which a thread in a queue for a shared resource is selected to receive exclusive access to the shared resource. For example, it is known to utilize a deterministic time in selecting a thread in the queue to receive exclusive access to a shared resource. The deterministic time can be computed as the amount of time consumed by a corresponding thread at the time of selection and can be measured, by way of example, as the number of instructions executed by the thread to date.

For instance, it is known to use the number of deferred loads executed by the thread as the deterministic time. Even still, to compute deferred loads, it is required to expressly code the scheduler to a specific hardware reference as different processor architectures provide different interfaces to CPU performance counters requisite to computing deferred loads. Additionally, some processors do not permit access to CPU performance counters to user space processes. To overcome this limitation, an operating system is required.

BRIEF SUMMARY OF THE INVENTION

Embodiments of the present invention address deficiencies of the art in respect to parallel computing and provide a novel and non-obvious method, system and computer program product for deterministic locking in a parallel computing environment. In an embodiment of the invention, a method for deterministic locking in a parallel computing environment is provided. The method includes creating a data structure in memory of a computer for a shared resource. The data structure encapsulates a reference to an owner of a lock for the shared resource and a queue of threads able to seek exclusive access to the shared resource. The queue in turn includes different entries, each entry including an identifier for a corresponding one of the threads and a deterministic time computed for the corresponding one of the threads from a count of memory accesses occurring in the corresponding one of the threads. Consequently, a thread can be deterministically selected from the queue to receive ownership of the lock and exclusive access to the shared resource based upon a deterministic time for the selected thread as compared to other deterministic times for others of the threads in the queue, for example, a lowest deterministic time.

In another embodiment of the invention, a method for deterministically managing concurrent processing of tasks in a parallel computing environment is provided. The method includes computing a deterministic time for execution of a task in a thread of execution in memory of a computer according to a count of memory accesses occurring in the thread of execution. The method further includes storing the computed deterministic time in a queue of a deterministic lock for a shared resource. The method yet further includes receiving a lock for the shared resource based upon the stored computed deterministic time. The method even yet further includes signaling other threads of execution in the queue to abort processing Finally, the method includes writing data to the shared resource resulting from the execution of the task and releasing the lock.

In yet another embodiment of the invention, a method for deterministically managing concurrent processing of tasks in a parallel computing environment is provided. The method includes executing a main task for solving a computational problem in memory by at least one processor of a computer, subsequently executing different secondary tasks each providing a solution to at least a portion of the computational problem using a different algorithm and computing a deterministic time for each of the secondary tasks. Exclusive access to a shared resource can be granted to one of the secondary tasks based upon a shortest computed deterministic time. Thereafter, a solution resulting from the execution of the one of the secondary tasks can be written to the shared resource, while aborting execution of remaining others of the secondary tasks. Finally, the solution written to the shared resource can be integrated with a solution produced by the main task.

In one aspect of the embodiment, the computational problem is one of a Linear Programming problem and a Quadratic Programming problems, and the different algorithm is selected from the group consisting of a primal simplex, a dual simplex, and a barrier algorithm. In another aspect of the embodiment, the computational problem is a Mixed Integer Non-Linear Programming problem and the secondary tasks are programmed to process different sets of primal heuristics to produce integer feasible solutions for corresponding ones of the sets of primal heuristics. In yet another aspect of the embodiment, the main task is a root node cutting plane loop and the secondary tasks are branch-and-bound without cutting planes (BBWCP) tasks programmed to produce integer feasible solutions for integration with the root node cutting plane loop.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

I. Overview

Embodiments of the invention provide for deterministic locking in a parallel computing environment. In accordance with an embodiment of the invention, a data structure can be created in memory of a computer for managing a lock on a shared resource in a parallel computing environment. The structure can include a data member specifying an owner process of the lock enjoying exclusive access to the shared resource, and a queue of other processes potentially seeking exclusive access to the shared resource. Of note, the structure additionally can include for each process entrant in the queue, a unique process identifier data member and a deterministic time data member. Scheduler logic implemented within a threading library can be configured to deterministically control the selection of different processes in the queue to acquire the lock based upon the deterministic times for each of the processes in the queue, however, the deterministic times are not computed according to CPU performance counters, but rather according to a counting of memory reads and writes for a corresponding thread. In this way, deterministic locking of the shared resource can be managed irrespective of the underlying hardware platform of the parallel computing environment and without requiring modification of the operating system supporting the parallel computing environment.

Figure 1:
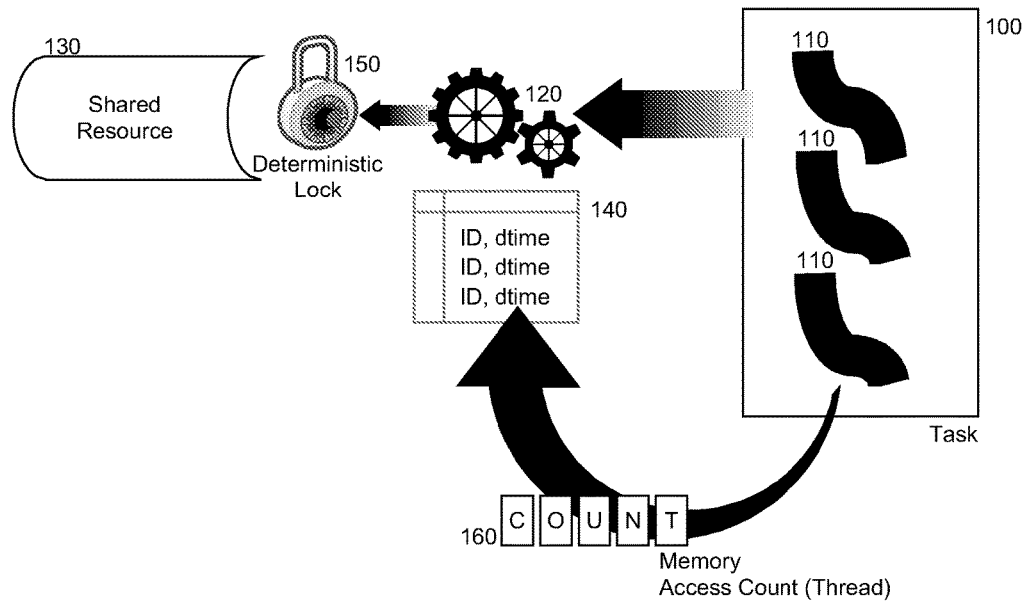
FIG. 1 is a pictorial illustration of a process for deterministic locking in a parallel computing environment.

In illustration, FIG. 1 is a pictorial illustration of a process for deterministic locking in a parallel computing environment. As shown in FIG. 1, a task 100 utilizing different executing threads 110 to perform sub-tasks in the task 100 can seek access to a shared resource 130. A scheduler 120 can manage a deterministic lock 150 for the shared resource 130 in order to assure that individual ones of the threads 110 are selected to obtain exclusive access to the shared resource 130 through the deterministic lock 150 in a deterministic rather than opportunistic fashion. In this regard, a locking data structure 140 can be maintained to include a queue of threads 110 able to seek access to the shared resource 130. Each entrant in the queue can provide not only a unique identifier, but also a deterministic time. Of import, the deterministic time can be computed for each of the threads 110 according to a memory access count 160 indicating a number of memory access requests, whether read or write operations, performed by a corresponding one of the threads 110. An individual one of the threads 110 reporting a lowest deterministic time in the data structure 140 can be selected to receive exclusive access to the shared resource 130 by the scheduler 120 when the deterministic lock 150 is released by another of the threads 110. In the event of a "tie", the unique identifier in the data structure 140 can be used to resolve the "tie".

Figure 2:
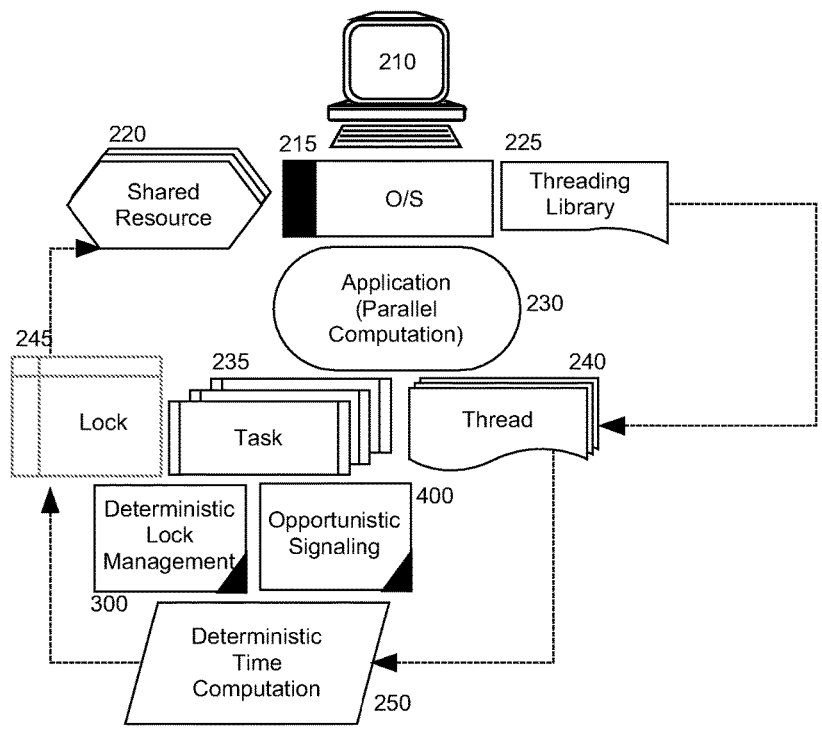
FIG. 2 is a schematic illustration of a parallel computing data processing system configured for deterministic locking in a parallel computing environment.

The process described in FIG. 1 can be implemented within a parallel computing environment. In further illustration, FIG. 2 is a schematic illustration of a parallel computing data processing system configured for deterministic locking in a parallel computing environment. The system can include a host computing system 210 of one or more computers, each configured with memory and one or more processors of one or more processing cores (for the purpose of illustrative simplicity, only a single icon for a computer is shown). The host computing system 210 can support the execution of one or more operating systems 215 that in turn can manage the operation of a computer program 230 configured for parallel computation using a threading library 225 included along with or provided as part of the operating system 215.

The computer program 230 can include one or more tasks 235. Each of the tasks 235 can be allocated one or more threads 240 for performing parallel computations on behalf of a corresponding one of the tasks 240. In an aspect of the embodiment, the threads 240 can be organized into a thread pool from which different ones of the threads 240 in the thread pool can be dynamically allocated to different ones of the tasks 235. One or more of the shared resources 220 can be allocated for use by the threads 240 of a corresponding one of the tasks 235 on an exclusive basis through the use of a lock 245. The lock 245 can be managed deterministically by deterministic lock management module 300 according to program code enabled to manage access to the shared resources 220 using deterministic locks computed for deterministic times computed for each of the threads 240. Optionally, the program code at run-time can select an opportunistic locking mode, or a deterministic locking mode. In the latter instance, the program code of the module 300 can manage access to the shared resources 220 according to deterministic times computed based upon a count of memory access operations provided by deterministic time computation logic 250 coupled to each of the threads 240.

Opportunistic signaling module 400 also can be provided as part of the system. The opportunistic signaling module 400 can include program code enabled to permit each of a grouping of the threads 240 for a corresponding one of the tasks 235 to compute at least a portion of a problem in parallel and to write results into the shared resource 220 using a deterministic lock managed by the deterministic lock management module 300. The opportunistic signaling module 400, however, can enable an individual one of the threads 240 in the grouping of the threads 240 to autonomously terminate the operation of the remaining ones of the threads 240 in the grouping of the threads 240 by signaling the remaining ones of the threads 240 in the grouping of the threads 240 to abort processing while obtaining the lock 245 on the shared resource 220. In this way, a portion of a computational problem can be solved in parallel using different solutions without a priori knowledge of an optimal solution, and a most time efficient solution can be selected dynamically while discarding the results of the remaining solutions.

II. Deterministic Locking

Figure 3A:
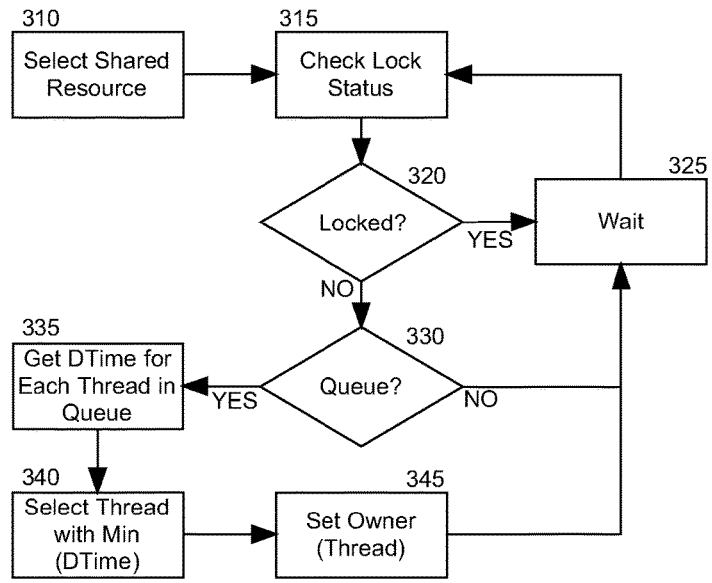
FIG. 3A is a flow chart illustrating a process for deterministic locking in a parallel computing environment.

In further illustration of the operation of the deterministic locking module 300, FIG. 3A is a flow chart illustrating a process for deterministic locking in a parallel computing environment. Beginning in block 310, a shared resource can be selected for management according to a deterministic lock. In block 315, a status of the lock can be determined. In decision block 320, if it is determined that the lock is currently set for a particular thread, in block 325 a wait cycle can begin and the process can return to block 315. In decision block 320, if it is determined that no thread has been set as the owner of the lock, in decision block 330, a queue of threads able to seek access to the lock can be inspected to determine whether or not any threads are entrant in the queue. If not, in block 325 a wait cycle can begin and the process can return to block 315. However, if different threads are entrant in the queue, in block 335 the deterministic time for each of the threads entrant in the queue can be retrieved and compared. In block 340, the thread associated with the shortest deterministic time can be selected to receive exclusive access to the shared resource and in block 345, the selected thread can be established as the owner of the lock.

Figure 3B:
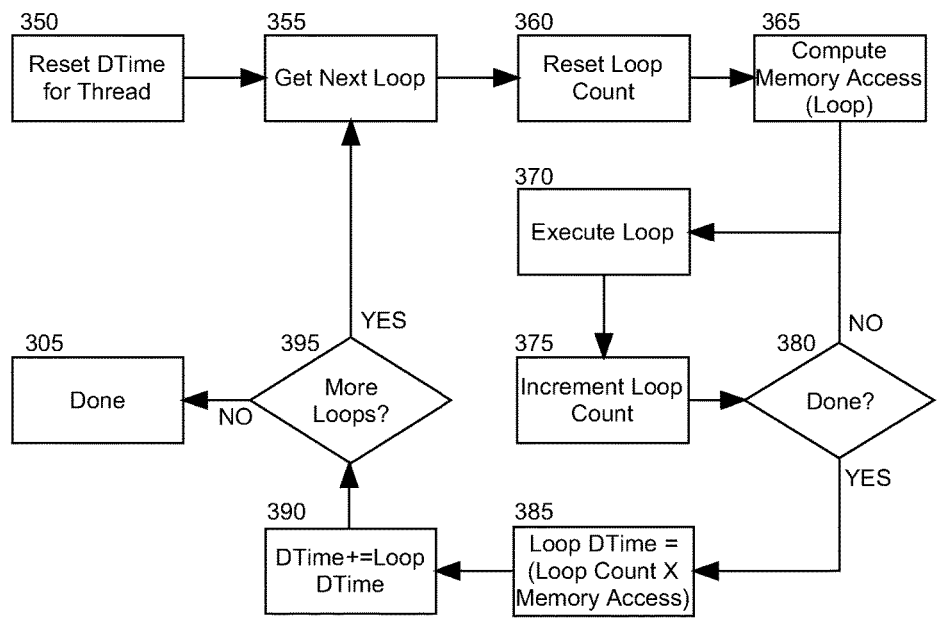
FIG. 3B is a flow chart illustrating a process for computing a deterministic time for a thread seeking exclusive access to a locked shared resource in the parallel computing environment of FIG. 3A.

In yet further illustration of the computation of the deterministic time for each thread, FIG. 3B depicts a process for computing a deterministic time for a thread seeking exclusive access to a locked shared resource in the parallel computing environment of FIG. 3A. Beginning in block 350, the deterministic time for the thread can be reset and in block 355, a first loop programmatically specified for execution in the thread can be selected. In block 360, a loop count of a number of iterations executed for the loop can be reset and in block 365 a number of memory access operations for the loop can be computed. In block 370 the loop can be executed and in block 375 the loop count can be incremented. In decision block 380, it can be determined whether or not the loop is to iterate. If so, the process can continue through block 370 with the iterative execution of the loop in block 370 and the incrementing of the loop count in block 375.

In decision block 380, when it is determined that the loop has exited, in block 385, the deterministic time for the loop can be computed as the product of the loop count and the number of memory accesses directed for each iterative execution of the loop. Thereafter, in block 390 the total deterministic time for the thread can be augmented by the loop deterministic time. In decision block 395, if additional loops have been programmatically specified for execution in the thread, the process can return to block 355 with the selection of a next loop and the process can repeat in block 360. In decision block 395, when no further loops have been programmatically specified for execution in the thread, the process can end in block 305 with the total deterministic time for the thread having been computed as the total count of memory access attempts for the thread.

III. Opportunistic Signaling and Deterministic Locking in Linear Programming Solutions As it is well-known, there are three principal algorithms for solving Linear or Quadratic Programming problems (LP/QP), the primal simplex, the dual simplex, and the barrier algorithm. Yet, it is a priori unknown which of the algorithms performs best on any particular problem instance. In order to always benefit from the best performing algorithm on a parallel computer, concurrent optimization can be applied by concurrently starting all algorithms in parallel, but by selecting the solution from the algorithm that completes first. The algorithm completing first can interrupt the remaining algorithms and can present its solution to the user while discarding the results of the interrupted algorithms.

Without further processing, the foregoing approach can yield non-deterministic results. Notwithstanding, LP/QP problems are often degenerate, meaning that there are many different valid optimal solutions to the same problem. Which one of these alternative solutions each algorithm finds is more or less known to be random. If two or more algorithms finish at roughly the same time, it depends on timing differences which algorithm can interrupt the others first. Since the time to run an algorithm depends on uncontrollable factors like the operating system scheduler and user interaction, the results of the concurrent optimizer may be non-deterministic, such that repeating the execution of the parallel algorithms with the same binary and data on the same computing system can lead to different results each time since a different algorithm may terminate first Therefore, in an embodiment of the invention, deterministic clocks are used to remedy the potential non-deterministic behavior resulting from opportunistic signaling.

Specifically, in an embodiment of the invention, concurrent execution of competing algorithms can occur in different threads while maintaining determinism of the results by applying deterministic signaling of concurrent tasks. When a thread executing one of the three algorithms terminates, the thread uses deterministic signals to deterministically interrupt the other algorithms. Because the signals are deterministic, for a given problem instance, hardware, and parameter settings, it will always be the same algorithm that succeeds in sending and thereby be selected as the algorithm that presents the solution to the user.

Figure 4:
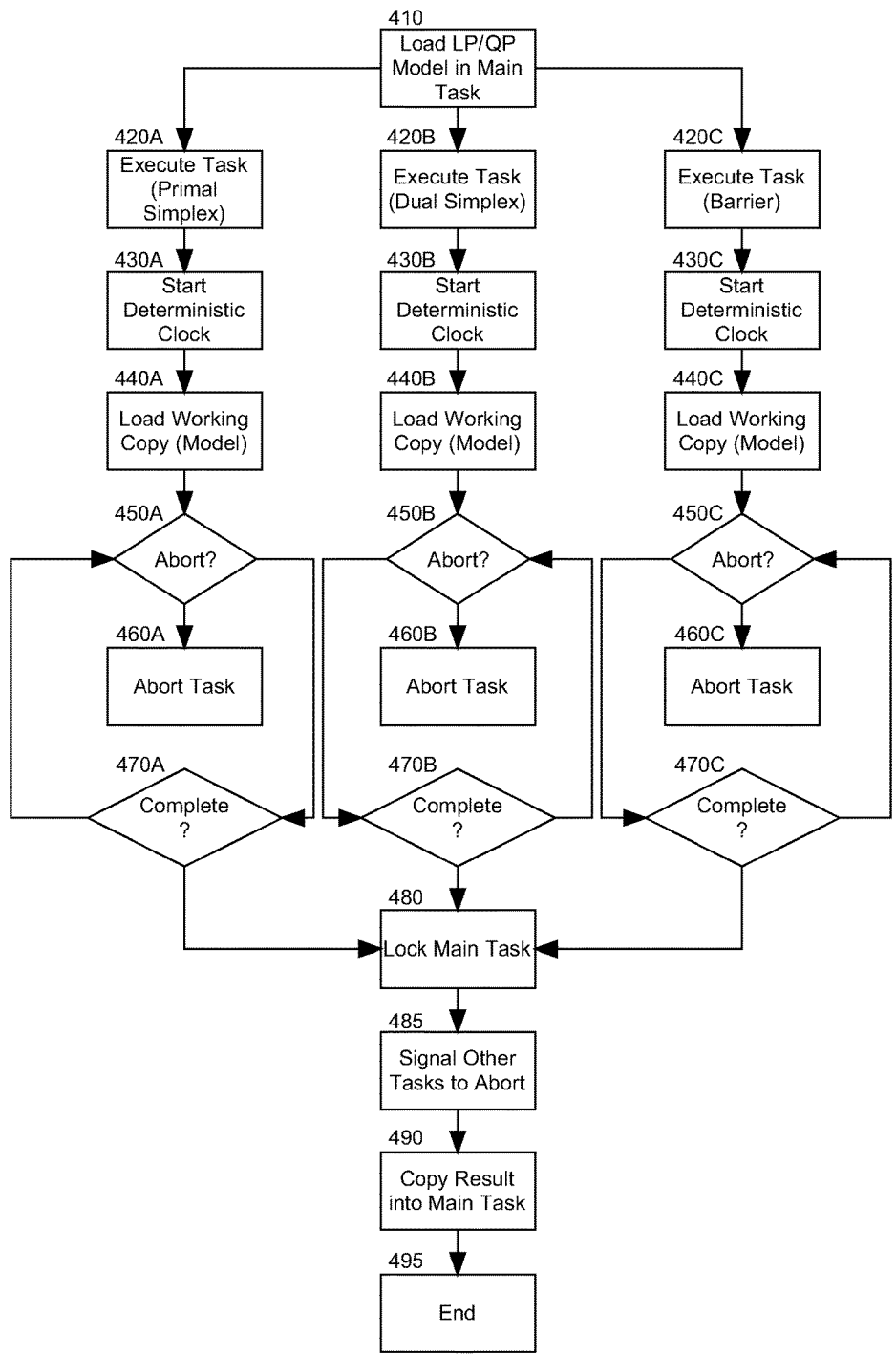
FIG. 4 is a flow chart illustrating a process for managing concurrent processing of a linear programming task using opportunistic signaling in order to preserve deterministic parallel computing.

In more particular illustration, FIG. 4 is a flow chart illustrating a process for managing concurrent processing of a task using opportunistic signaling in order to preserve deterministic parallel computing. Beginning in block 410, a LP/QP model is loaded for solution as a main task. Concurrently, in blocks 420A, 420B, 420C, respectively different algorithmic solutions are executed in respectively different tasks for which respectively different deterministic clocks are maintained in blocks 430A, 430B, 430C. In blocks 440A, 440B, 440C, a working copy of the model can be copied from the shared resource of the main task into a thread for each of the different tasks performing the different algorithms.

Periodically, each of the tasks in decision block 450A, 450B, 450C can check to see if an abort signal has been received from another of the tasks. If so, those of the tasks receiving the signal can abort processing in blocks 460A, 460B, 460C with all results discarded. However, in the absence of receiving an abort signal, the tasks can proceed to completion. In this regard, in decision blocks 470A, 470B, 470C, if the task processing completes, in block 480 a lock can be attained deterministically according to the process of FIG. 3A and in block 485 a signal can be issued to the other tasks to abort. In block 490 the results of the task processing can be copied into the main task and in block 495, the process can end.

IV. Opportunistic Signaling and Deterministic Locking in Mixed Integer Non-Linear Programming Solutions Before engaging in the branching phase, branch-and-cut based mixed integer programming or mixed integer non-linear programming solvers iteratively generate cutting planes for the solution of the root relaxation. This process is highly sequential as it iterates through the following steps until some termination criterion is reached:
 solve a relaxation of the problem
 compute a set of cutting planes that are violated by the relaxation solution
 add (a subset) of those cuts to the relaxation
 optionally try some heuristics to find integer feasible solutions
 iterate the process until some termination criterion is hit Due to the sequential nature of this solve-and-cut loop, it is not very amenable to parallelization.

However, other tasks can be executed concurrently to the cut loop and can compute additional information that is useful for the algorithm. The problem is that one desires to interrupt such computation as soon as the cut loop reaches a state where the information gathered in the concurrent tasks are no longer useful and one would like to spend the computing resources on different tasks. In particular, when the cut loop terminates it is preferred to engage in the parallel branching phase of the overall algorithm with all processors. The problem with concurrently processed tasks is that this may yield non-deterministic results. How much information the concurrent tasks generate and provide for the main algorithm depends on the time at which the tasks are interrupted. Thus depending on subtle timing differences, different executions of the cut loop may result in different information being available for the main algorithm and thus different execution of the main algorithm.

In an embodiment of the invention, the operations are executed concurrently to the main cut-loop of the mixed integer non-linear programming in a deterministic fashion using deterministic locks to deterministically share information between the main task and the concurrent tasks while the concurrent tasks are being processed and the use of deterministic signaling to deterministically interrupt concurrent operations at certain stages of the main cut loop, in particular as soon as the main cut loop terminates.

Figure 5A:
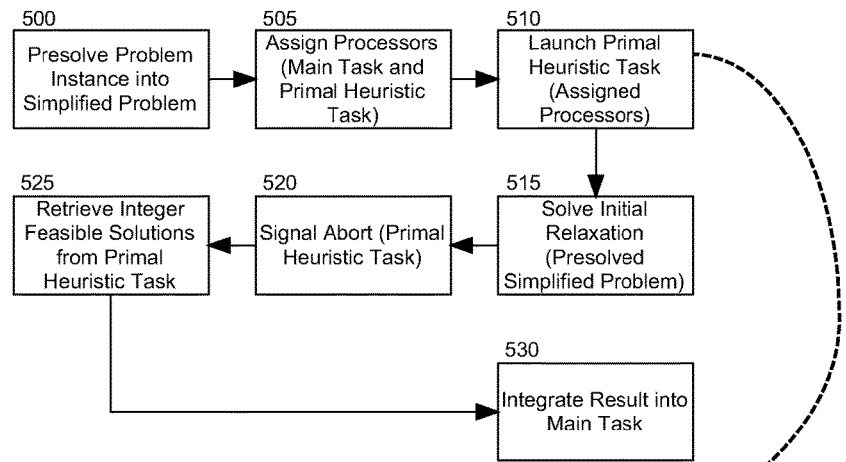
FIG. 5A is a flow chart illustrating a process for configuring a mixed integer non-linear programming task for solution using deterministic parallel computing; and, FIG. 5B is a flow chart illustrating a process for managing concurrent processing of a primal heuristic computing task for the mixed integer non-linear programming task of FIG. 5A using opportunistic signaling in order to preserve deterministic parallel computing.

In further illustration and by way of example in respect to the application of primal heuristics to a linear programming relaxation, FIG. 5A is a flow chart illustrating a process for configuring a linear programming task for solution using deterministic parallel computing. Beginning in block 500, the linear programming task can be pre-solved to generate an equivalent problem instance that is easier to solve. In block 505, different processors—for instance threads of execution in a pool of threads—can be assigned to the primal heuristic task with the remaining ones of the processors being assigned to the main task. Thereafter, in block 510 the primal heuristic task can be launched with respect to the correspondingly assigned processors in order to produce different integer feasible solutions. In block 515, an initial relaxation of the presolved problem instance can be solved. Once complete, in block 520 an abort signal can be provided to the primal heuristic task. Finally, in block 525 integer feasible solutions produced by the primal heuristic task prior to the receipt of the abort signal can be retrieved and integrated into the main task in block 530.

Figure 5B:
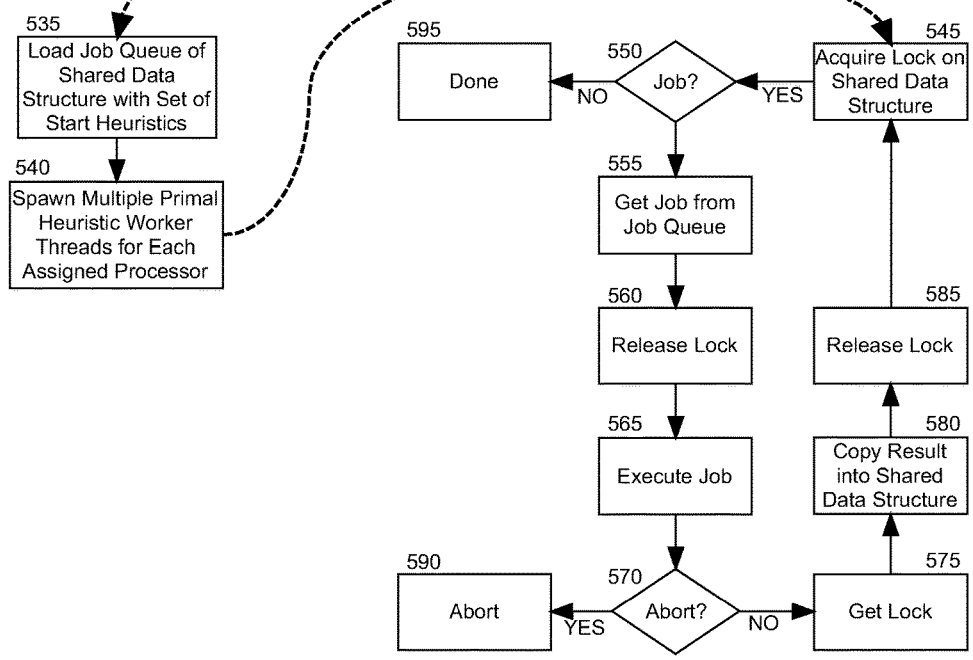

Turning now to FIG. 5B, a flow chart is provided illustrating a process for managing concurrent processing of a primal heuristic computing task for the linear programming task of FIG. 5A using opportunistic signaling in order to preserve deterministic parallel computing. Beginning in block 535, upon the launching of the primal heuristic task, a job queue of a shared data structure protected by a deterministic lock can be populated with different start heuristics and in block 540, multiple different threads can be assigned to compute integer feasible solutions according to each set of start heuristics in the queue. Specifically, in block 545, each thread can acquire a lock on the shared data structure and can determine in decision block 550 if any jobs for a set of start heuristics remain. If not, the process can end in block 595.

Otherwise, in block 555 a job can be retrieved from the queue and in block 560 the lock can be released for the shared data structure. In block 565, the job can be executed in the thread. In decision block 570, if an abort signal is received, in block 590 the thread can abort processing with all results discarded. However, if no abort signal has been received in decision block 570, in block 575 a lock on the shared data structure can be acquired (deterministically) and in block 580 the results of executing the job can be copied into the shared data structure as an integer feasible solution. Thereafter, in block 585 the lock can be released and the process can return to block 545. In this way, the primal heuristic task is free to compute integer feasible solutions in parallel to the relaxation of the linear programming problem in the main task until such time as the main task is ready to retrieve the solutions while maintaining the deterministic execution of the parallel computations of the integer feasible solutions.

V. Engaging into Branch-and-bound without Cutting Plane Separation while the Main Task Executes the Root Node Cutting Plane Loop Cutting plane separation is an optional step in branch-and-cut algorithms. Nevertheless, cutting plane separation is employed to improve solving performance. On the other hand, a number of problem instances can be solved faster without cutting plane separation because branching alone quickly finds the optimal solution and proves its optimality. Thus, cutting plane separation in this instance could be wasteful. Consequently, even if branch-and-bound without cutting planes (BBWCP) is not able to solve the problem instance to optimality, integer feasible solutions and a globally valid bound on the optimal objective function value ("global dual bound") and for the variables can be injected into the main branch-and-cut algorithm to improve overall performance.

The following steps are executed in the algorithm:
Given:
output of the application of primal heuristics to the initial root LP relaxation solve of FIG. 5A:
simplified problem instance,
(optionally) integer feasible solutions,
solution of the initial relaxation of the simplified problem instance
total number T of processors
number B<T of processors to work on the optional BBWCP concurrently to the main task Main Task:
1. Set up a data structure to share information between the "Main Task" and the "BBWCP Task". Protect this shared data structure with the deterministic lock of the global task.
2. Assign B processors to the BBWCP Task and keep T-B processors to work on the Main Task.
3. Compute a set of cutting planes that are violated by the relaxation solution.
4. Add (a subset) of those cuts to the relaxation.
5. Optionally try some heuristics to find integer feasible solutions.
6. Synchronize data:
   (a) acquire the deterministic lock of the shared data structure,
   (b) copy unknown integer feasible solutions from shared data into the Main Task,
   (c) copy new solutions found in the Main Task to shared data,
   (d) update the global dual bound to be the better of the Main Task's global dual bound and the global dual bound of the BBWCP Task, and copy global dual bound into shared data,
   (e) similarly update the variable bounds for each variable to the tighter value of the value in the global shared data and in the Main Task.
   (f) release the deterministic lock.
7. Solve the relaxation (complemented by cuts) of the problem instance.
8. If the cut loop termination criterion is not satisfied, repeat computation of a set of cutting planes.
9. Send an abort signal to the BBWCP Task and wait for the task to finish.
10. Collect results (integer feasible solutions and global dual bound) from the BBWCP Task and integrate them into the Main Task's data structures.

BBWCP Task:
1. Solve the problem at hand on all threads for this task using branch-and-bound without generating/using any cuts until the task is signaled interrupted or optimality or infeasibility is proven.
2. Whenever the BBWCP task finds a feasible solution or improve the dual bound significantly:
   (a) acquire the deterministic lock of the shared data structure,
   (b) copy unknown integer feasible solutions from shared data into the BBWCP Task,
   (c) copy new solutions found in the BBWCP Task to shared data,
   (d) update the global dual bound to be the better of the Main Task's global dual bound and the global dual bound of the BBWCP Task, and copy the global dual bound into shared data,
   (e) similarly update the variable bounds for each variable to the tighter value of the value in the global shared data and in the Main Task.
   (f) release the deterministic lock.

As with the integration of primal heuristics to collect integer feasible solutions for the root relaxation problem of FIGS. 5A and 5B, the use of deterministic signals and deterministic locks guarantees determinism of the results. Since the Main Task regularly synchronizes with the global shared data, each time the deterministic lock is acquired, there would be a danger that the Main Task must wait to acquire the lock deterministically. This would happen if the deterministic clocks of the Main Task runs faster in real time than the BBWCP Task. To prevent such a situation and ensure that the Main Task does not incur any such wait times, the clock of the BBWCP Task is artificially scaled higher.

VI. Conclusion

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method comprising:

defining a plurality of tasks for performance in a deterministic parallelization environment, with each task including a set of thread(s);

for each given thread of each task of the plurality of tasks, calculating a respectively set of atomic read/write operations to be carried out by the given thread and computing a count of the set of atomic read/write operations to be carried out by the given thread;

for each given thread of each task of the plurality of tasks, generating a respectively associated deterministic clock based upon the count of the set of atomic read/write operations associated with the given thread; and for each given task of the plurality of tasks, generating a task-specific lock to be accessed by the thread(s) included in the given task, with the generation of the task-specific lock of the given task being based upon the deterministic clock(s) associated with the thread(s) included in the given task;

wherein the generating of a respectively associated deterministic clock based upon the set of atomic read/write operations associated with the given thread comprises first resetting each of the threads and then, in each corresponding one of the threads, selecting a loop programmatically specified for execution in the corresponding one of the threads, resetting a loop count of a number of iterations executed for the loop, computing a number of memory access operations for the loop, executing the loop and incrementing the loop count and iteratively additionally executing the loop with a corresponding incrementing of the loop count until exiting the loop in response to which a loop deterministic time for the loop is computed as a product of the loop count and a number of memory accesses directed for each iterative execution of the loop with a total deterministic time for the corresponding one of the threads being augmented by the loop deterministic time.

2. The method of claim 1, further comprising:
at run time of a first task, of the plurality of tasks, in the deterministic parallelization environment, selecting the task-specific lock of the first task to be deterministic.

3. The method of claim 1, further comprising:
at run time of a first task, of the plurality of tasks, in the deterministic parallelization environment, selecting the task-specific lock of the first task to be opportunistic.

4. The method of claim 1, further comprising:
performing signaling in a deterministic manner.

5. The method of claim 1, further comprising:
performing time scaling.

6. A method comprising:

defining a plurality of tasks for performance in a deterministic parallelization environment, with each task including a set of thread(s);

for each given thread of each task of the plurality of tasks, calculating a respectively set of atomic read/write operations to be carried out by the given thread;

for each given thread of each task of the plurality of tasks, generating a respectively associated deterministic clock based upon the set of atomic read/write operations associated with the given thread by first resetting each of the threads and then, in each corresponding one of the threads, selecting a loop programmatically specified for execution in the corresponding one of the threads, resetting a loop count of a number of iterations executed for the loop, computing a number of memory access operations for the loop, executing the loop and incrementing the loop count and iteratively additionally executing the loop with a corresponding incrementing of the loop count until exiting the loop in response to which a loop deterministic time for the loop is computed as a product of the loop count and a number of memory accesses directed for each iterative execution of the loop with a total deterministic time for the corresponding one of the threads being augmented by the loop deterministic time; and for each given task of the plurality of tasks, generating a task-specific lock to be accessed by the thread(s) included in the given task, with the generation of the task-specific lock of the given task being based upon the deterministic clock(s) associated with the thread(s) included in the given task.

* * * * *